W. A. CALDWELL.
VENTILATED GRAIN CRIB OR SILO.
APPLICATION FILED MAY 9, 1918.
1,298,174.
Patented Mar. 25, 1919.
2 SHEETS—SHEET 1.
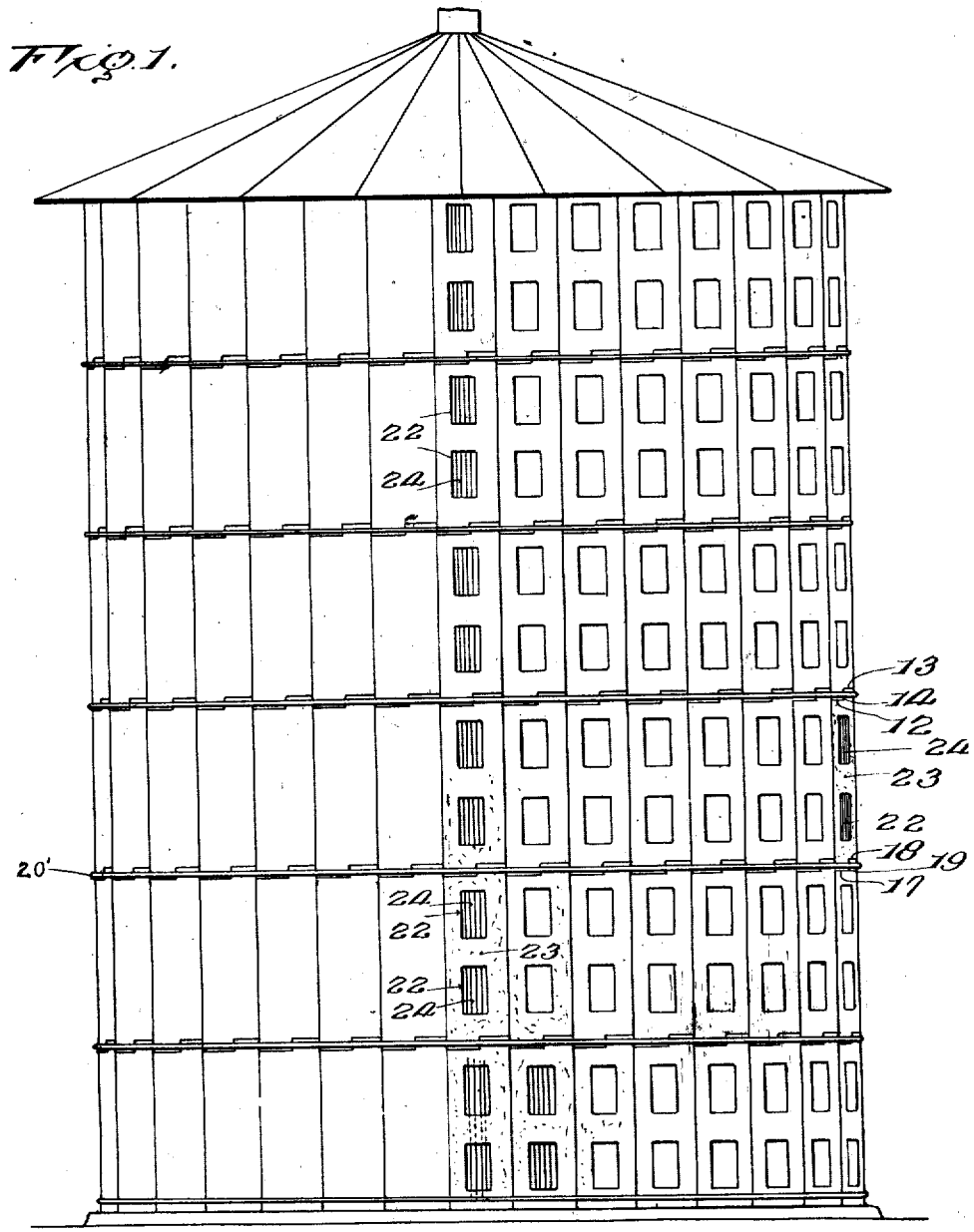
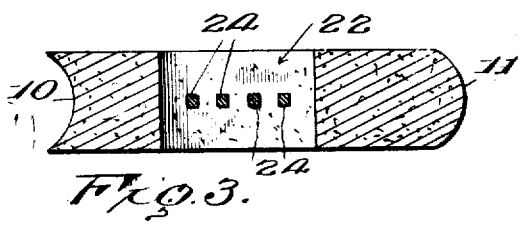
Inventor
W. A. Caldwell
By Lacey & Lacey, Attorneys

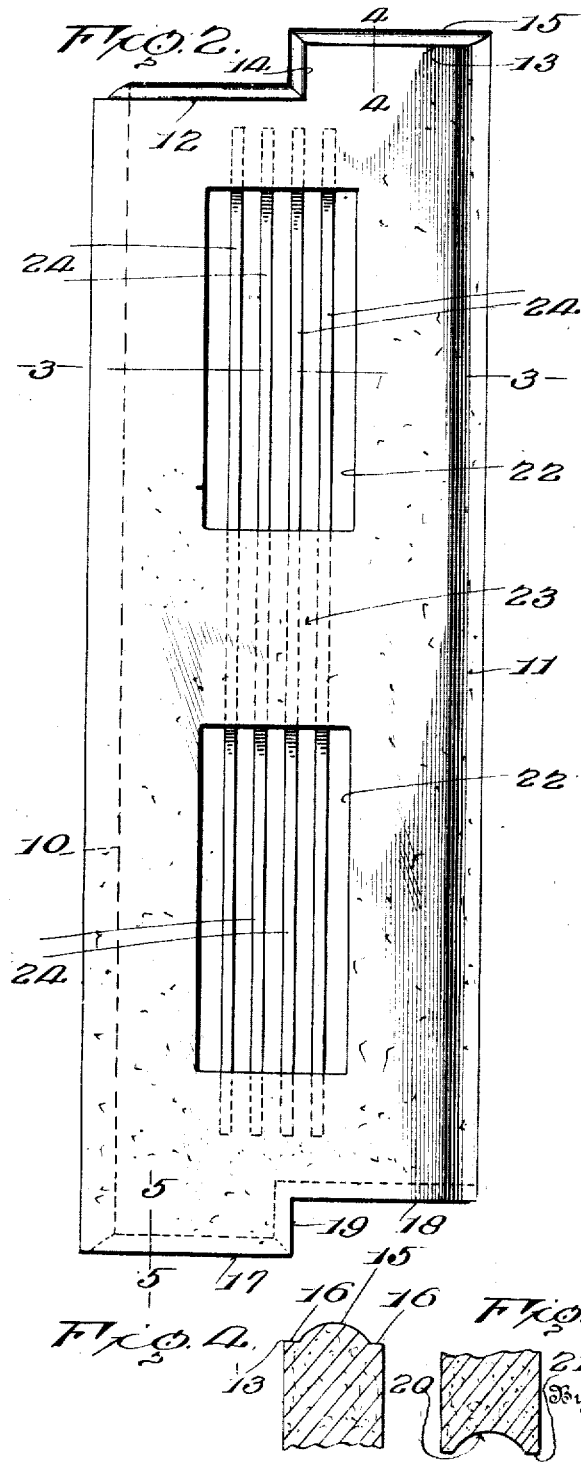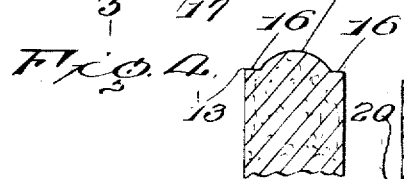

UNITED STATES PATENT OFFICE.

WARREN A. CALDWELL, OF OSKALOOSA, IOWA.

VENTILATED GRAIN-CRIB OR SILO.

1,298,174.  Specification of Letters Patent.  Patented Mar. 25, 1919.

Application filed May 9, 1918. Serial No. 233,518.

*To all whom it may concern:*

Be it known that I, WARREN A. CALDWELL, a citizen of the United States, residing at Oskaloosa, in the county of Mahaska and State of Iowa, have invented certain new and useful Improvements in Ventilated Grain-Cribs or Silos, of which the following is a specification.

This invention relates to an improved grain crib or silo of the general type illustrated in Patent No. 1,242,420, issued to me October 9, 1917, and has as its primary object to provide a structure which will be properly ventilated for drying out or curing grain or other crop stored therein.

The invention has as a further object to provide a stave for forming the structure which will be constructed with ventilating openings therethrough and wherein reinforcing bars will be employed within the stave and so arranged as to form gratings extending across such openings.

A further object of the invention is to provide a stave wherein the gratings formed by the reinforcing bars thereof will be adapted not only to prevent waste of any stored material through the ventilating openings of the stave but also adapted to prevent the entrance of rodents through the said openings.

And the invention has as a still further object to provide a stave so constructed that the ventilating openings may be formed therein at the time the stave is molded.

Other and incidental objects will appear as the description proceeds. In the drawings wherein I have illustrated the preferred embodiment of the invention, and wherein similar reference characters designate corresponding parts throughout the several views:

Figure 1 is a side elevation showing a silo or grain bin constructed in accordance with the present invention, Fig. 2 is a side elevation showing one of the staves of the structure in detail and particularly illustrating the ventilating openings therein as well as the disposition of the reinforcing bars for the stave to form gratings at the said openings, Fig. 3 is a transverse sectional view taken on the line 3—3 of Fig. 2, this view particularly showing the disposition of the reinforcing bars medially of the stave, Fig. 4 is a fragmentary vertical section taken on the line 4—4 of Fig. 2, Fig. 5 is a fragmentary vertical sectional view similar to Fig. 4 and taken on the line 5—5 of Fig. 2.

Referring now more particularly to the drawings, I have, in Fig. 1, shown a crib or ventilated silo constructed in accordance with the present improvements. A stave of the design shown particularly in Fig. 2 is employed and in the construction of the crib *c* said staves are arranged in courses built successively upon each other. However, it should in this connection be observed that the outer end edges of the staves forming the top and bottom courses of the structure are straight so that the bottom course may rest flat upon a suitable foundation while a roof of approved character may be erected upon the top course.

As previously intimated, the stave of the present invention is, in its general form, similar to the stave disclosed in my prior patent referred to and in Fig. 2 of the drawings I have shown the stave in detail. This stave is preferably oblong in outline and is formed of concrete or other similar material. The longitudinal edges of the stave are respectively concave and convex, as indicated at 10 and 11, the concave edge of one stave being adapted to receive the convex edge of an adjacent stave so that the longitudinal edges of abutting staves will interfit. At its ends the stave is reversely offset so that the ends of the staves of one course of a structure erected therefrom will, as shown in Fig. 1, match with and overlap the abutting ends of the staves of a superposed course. Transverse offset edge portions 12 and 13 respectively are thus defined at one end of the stave. These edge portions are approximately of equal length and are joined medially of the staves by a longitudinal portion or shoulder 14. As particularly shown in Fig. 4, these several portions are provided with a continuous medial rib 15 terminating in spaced relation to the side faces of the stave to define flat marginal end faces 16. At its opposite end the stave is formed with transverse offset edge portions 17 and 18 respectively corresponding to the edge portions 12 and 13 at the other end of the stave and joined at their inner extremities by a medial longitudinal edge portion or shoulder 19 corresponding to the shoulder 14. Formed in the edge portions 17, 18 and 19 is a continuous medial groove 20 adapted to receive the rib 15 of an abutting stave and defining flat marginal end faces 21. Thus, it will be seen that in the erection of a structure as shown in Fig. 1, the grooves 20 of the staves of one course will receive the ribs 15 of the staves of a subjacent course so that the staves will thus interfit in overlapping relation at their ends while the flat end faces 16 and 21 of the staves will abut for sustaining the major portion of the load of the staves and thus prevent undue lateral strain within the channels 20. It will therefore be seen that the staves of the several courses will coact to provide a rigid structure since the staves will interlock at their meeting edges. Surrounding the overlapping end portions of the staves at the junction of the courses thereof are suitable hoops 20' adapted to bind the staves of the several courses together and rigidly brace the structure against expansion under the influence of internal pressure set up when the crib is filled.

In order that the crib may be formed for properly ventilating or drying out its contents, I construct the stave of the present invention with ventilating openings 22. The number of openings employed in each stave may, of course, be varied as desired but I preferably form the stave with two of the said openings spaced medially of the stave to extend longitudinally thereof. An intermediate web 23 is thus defined between the inner ends of the said openings. Embedded within the stave medially thereof to extend across the ventilating openings is a plurality of rigid reinforcing rods or bars 24 which are arranged substantially parallel to each other to extend longitudinally of the stave. These reinforcing bars thus extend medially through the web 23 for bracing the said web and at their end portions project beyond the outer ends of the ventilating openings into the body of the stave so that the said bars will thus also longitudinally reinforce the stave. At the same time, these bars will, as will now be clear, form gratings across the ventilating openings adapted to retain the contents of the crib so that wasting thereof will be avoided while a free circulation of air through the ventilating openings will be permitted for properly ventilating or drying out the contents of the crib. Furthermore, by spacing the reinforcing bars closely together, the gratings will prevent the entrance of rodents into the crib.

Having thus described the invention, what is claimed as new is:

1. A concrete silo stave including an elongated body portion having spaced openings formed therein and extending in the direction of the length of the stave and opening through the opposite side faces thereof, said openings defining an intermediate connecting web, and a plurality of rigid reinforcing bars having their intermediate portions extending through the connecting web and their opposite ends extended across said openings and embedded in the body portion to form a grating.

2. A concrete silo stave including a solid elongated body portion having spaced openings formed therein medially of the stave and extending in the direction of the length thereof and opening through the opposite side faces of said stave, said openings defining an intermediate connecting web, and a plurality of laterally spaced rigid reinforcing bars having their intermediate portions extending through the connecting web at the center thereof and their opposite ends extended across said openings and embedded in the body portion to form a grating.

3. A concrete silo stave including a solid elongated body portion having substantially rectangular openings formed therein and extending in the direction of the length of the stave and opening through the opposite side faces thereof, the outer walls of said openings terminating short of the adjacent ends of the staves and the inner walls of said openings being spaced apart to form an intermediate connecting web, and a plurality of laterally spaced rigid longitudinal reinforcing rods having their intermediate portions embedded in and extended through the connecting web at substantially the center thereof and their opposite ends extended across said openings with the terminals of the rods embedded in the body portion between the outer walls of the openings and the adjacent ends of the stave.

4. A ventilated concrete silo including a plurality of vertically disposed solid staves arranged end to end in superposed courses and each provided with spaced openings extending in the direction of the length of the stave and opening through the opposite side faces thereof and defining an intermediate connecting web, and a plurality of rigid longitudinal reinforcing bars embedded in each stave with the intermediate portions of the bars extending through the connecting web and the opposite ends of said bars extended across the adjacent openings and terminating short of the adjacent ends of the stave, the reinforcing bars of the staves of the different courses being disposed substantially in vertical alinement with each other and retaining hoops encircling the silo at the junction of the ends of adjacent staves.

In testimony whereof I affix my signature.

WARREN A. CALDWELL. [L. S.]